United States Patent
Takeda et al.

(10) Patent No.: US 9,342,007 B2
(45) Date of Patent: May 17, 2016

(54) POLYIMIDE SEAMLESS BELT FOR IMAGE FORMING APPARATUS

(71) Applicants: Sachiko Takeda, Kanagawa (JP); Shigeru Hashiura, Kanagawa (JP); Kenji Ohta, Kanagawa (JP); Asae Kamata, Kanagawa (JP)

(72) Inventors: Sachiko Takeda, Kanagawa (JP); Shigeru Hashiura, Kanagawa (JP); Kenji Ohta, Kanagawa (JP); Asae Kamata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/819,762

(22) Filed: Aug. 6, 2015

(65) Prior Publication Data

US 2016/0041513 A1   Feb. 11, 2016

(30) Foreign Application Priority Data

Aug. 11, 2014   (JP) ................................. 2014-163559

(51) Int. Cl.

| | |
|---|---|
| G03G 15/16 | (2006.01) |
| G03G 15/20 | (2006.01) |
| G03G 5/05 | (2006.01) |
| B29C 41/14 | (2006.01) |
| C08J 5/00 | (2006.01) |
| H01B 1/24 | (2006.01) |
| B29K 79/00 | (2006.01) |
| B29L 29/00 | (2006.01) |
| B29L 31/00 | (2006.01) |
| C08K 3/04 | (2006.01) |

(52) U.S. Cl.
CPC ............ *G03G 15/2057* (2013.01); *B29C 41/14* (2013.01); *C08J 5/00* (2013.01); *G03G 15/162* (2013.01); *H01B 1/24* (2013.01); *B29K 2079/08* (2013.01); *B29L 2029/00* (2013.01); *B29L 2031/767* (2013.01); *C08J 2379/08* (2013.01); *C08K 3/04* (2013.01); *C08K 2003/045* (2013.01); *G03G 5/0571* (2013.01)

(58) Field of Classification Search
CPC ............ G03G 15/2057; G03G 15/162; G03G 5/0571; B29C 41/14; C08J 5/00; C08J 2379/08; H01B 1/24; B29K 2079/08; B29L 2028/00; B29L 2031/767; C08K 3/04; C08K 2003/045

See application file for complete search history.

(56) References Cited

U.S. PATENT DOCUMENTS

| | | | | |
|---|---|---|---|---|
| 3,563,916 A | * | 2/1971 | Takashima et al. | ...... H01B 1/24 252/511 |
| 6,352,750 B1 | | 3/2002 | Kanetake | |
| 7,396,492 B2 | * | 7/2008 | Price | ...... C08L 59/00 252/511 |
| 2007/0274738 A1 | * | 11/2007 | Watanabe | ...... G03G 15/0233 399/149 |
| 2011/0027709 A1 | * | 2/2011 | Wu | ...... G03G 15/162 430/104 |

FOREIGN PATENT DOCUMENTS

| | | |
|---|---|---|
| JP | 2002-148957 | 5/2002 |
| JP | 3708867 | 8/2005 |
| JP | 4406782 | 11/2009 |
| JP | 2011-002713 | 1/2011 |
| JP | 5079354 | 9/2012 |

* cited by examiner

*Primary Examiner* — Joseph S Wong
(74) *Attorney, Agent, or Firm* — Cooper & Dunham LLP (57) ABSTRACT

A polyimide seamless belt for an image forming apparatus, which contains: polyimide containing a segment derived from aromatic diamine, and a segment derived from aromatic tetracarboxylic acid; and two types of carbon black, which are high-structure carbon black capable of imparting high conductivity, and acidic carbon black, where the two types of the carbon black are dispersed in the polyimide seamless belt, wherein the polyimide seamless belt has surface resistivity of $10^8 \Omega/\square$ or less.

8 Claims, 2 Drawing Sheets

POLYIMIDE SEAMLESS BELT FOR IMAGE FORMING APPARATUS

BACKGROUND OF THE INVENTION

1. Field of the Invention

The present invention relates to a polyimide seamless belt used for an image forming apparatus using electrophotography, such as a photocopier, and a printer, and to a production method thereof.

2. Description of the Related Art

Conventionally, a polyimide seamless belt has been used for various use, as a member of an image forming apparatus utilizing electrophotography. Examples of use thereof include a fixing belt, a transfer belt, and a paper conveyance belt. Particularly, a polyimide seamless belt is used as an intermediate transfer belt or a base of a fixing belt (see, for example, Japanese Patent (JP-B) No. 3708867).

Various methods have been known as a production method of the aforementioned polyimide seamless belt used in an electrophotographic image forming apparatus. The methods that have been already known include centrifugal forming where an internal surface of a mold is coated with a coating material and the coating material is flow casted to yield a shaped product, and a method where a coating material (referred to as a polyamic acid composition liquid hereinafter) is prepared by synthesizing polyamic acid, which is a precursor of polyimide, in an organic polar solvent, and adding conductive carbon black to the resultant, and an internal or external surface of a mold is coated with the coating material, and the coating material is flow-casted, and the resultant is dried and imidized using a hot air furnace (see, for example, JP-B Nos. 5079354, and 4406782).

Such a belt is required to have various properties, such as heat resistance, and surface qualities, depending on use thereof, as well as mechanical properties, and electric properties. It has been known that the properties are influenced by firing conditions at the time of drying and imidization. A polyimide seamless belt having high strength and high resistance to heat can be attained by sufficiently removing the residual solvent through heating.

If a thick polyimide seamless belt is attempted to be produced to enhance the strength, a solvent permeability becomes poor depending on a type of polyamic acid for use due to a molecular structure thereof, and swelling or a defect in an appearance, such as rough surface (texture like zest of a citrus fruit) may occur.

In this case, a thick seamless belt is formed by typically applying a coating material to a metal mold, and taking time to perform an imidization process so as not to impair an appearance of a resulting seamless belt. Alternatively, as disclosed in JP-B No. 3708867, internal surfaces of a metal mold is coated with a polyamic acid composition liquid, the polyamic acid composition liquid is casted, the composition liquid is dried at 130° C. or lower, and then a resultant is taken out from the mold. The dried product is then placed in another mold for imidization firing in the manner that a surface thereof to be in contact with the air is reversed during drying and during imidization, to thereby produce a thick seamless belt. When a seamless belt is produced in the aforementioned manner, however, it takes a lot of trouble, as the mold for use needs to be changed when dried and when imidized, and a cost for equipment is increased, as a number of steps and processes to be performed is increased.

Moreover, Japanese Patent Application Laid-Open (JP-A) No. 2011-002713 discloses that electric resistivity is secured with a minimum amount of acidic carbon black, by using quaternary ammonium salt as a cationic surfactant, to thereby stably homogeneously disperse the acidic carbon black in a polyimide precursor. Moreover, JP-A No. 2002-148957 discloses an intermediate transfer member containing 20% by weight to 30% by weight of oxidized carbon black, and lists, as examples of the oxidized carbon black, PRINTEX150T (pH: 4.5, volatile matter: 10.0%) manufactured by Evonik Industries AG, Special Black 350 (pH: 3.5, volatile matter: 2.2%) manufactured by Evonik Industries AG, Special Black 100 (pH: 3.3, volatile matter: 2.2%) manufactured by Evonik Industries AG, Special Black 250 (pH: 3.1, volatile matter: 2.0%) manufactured by Evonik Industries AG, Special Black 5 (pH: 3.0, volatile matter: 15.0%) manufactured by Evonik Industries AG, Special Black 4 (pH: 3.0, volatile matter: 14.0%) manufactured by Evonik Industries AG, Special Black 4A (pH: 3.0, volatile matter: 14.0%) manufactured by Evonik Industries AG, Special Black 550 (pH: 2.8, volatile matter: 2.5%) manufactured by Evonik Industries AG, Special Black 6 (pH: 2.5, volatile matter: 18.0%) manufactured by Evonik Industries AG, Color Black FW200 (pH: 2.5, volatile matter: 20.0%) manufactured by Evonik Industries AG, Color Black FW2 (pH: 2.5, volatile matter: 16.5%) manufactured by Evonik Industries AG, Color Black FW2V (pH: 2.5, volatile matter: 16.5%) manufactured by Evonik Industries AG, MONARCH 1000 (pH: 2.5, volatile matter: 9.5%) manufactured by Cabot Corporation, MONARCH 1300 (pH: 2.5, volatile matter: 9.5%) manufactured by Cabot Corporation, MONARCH 1400 (pH: 2.5, volatile matter: 9.0%) manufactured by Cabot Corporation, MOGUL-L (pH: 2.5, volatile matter: 5.0%) manufactured by Cabot Corporation, and REGAL 400R (pH: 4.0, volatile matter: 3.5%) manufactured by Cabot Corporation. Two of these oxidized carbon black may be used in combination.

However, a surfactant is typically decomposed, as the surfactant is exposed to temperature exceeding 300° C. Polyimide is attained by heating polyamic acid composed of tetracarboxylic dianhydride and a diamine component to perform a dehydration condensation reaction. The temperature for the heating is 300° C. to 450° C., and thus it is hardly believed that the surfactant inside the formed belt has a function to directly reduce electric resistance. When it is attempt to form a belt having a surface resistivity Log ρs of 5.0 or less using the surfactant disclosed in JP-A No. 2011-002713, moreover, formation of a conduction path is inhibited by a functional group (e.g., a carboxyl group, a ketone group, a lactone group, and a hydroxyl group) containing oxygen present on a surface of acidic carbon black. Therefore, it is necessary to significantly increase the amount of the acidic carbon black added, which impairs mechanical strength of the belt.

Moreover, there is no assumption or intention for the technology disclosed in JP-A No. 2002-148957 to use high-structure carbon black. Accordingly, the technology naturally does not aim to improve dispersibility of carbon black when a coating liquid containing the high-structure carbon black which can exhibit conductivity with a small amount, and polyamic acid.

When a high-structure carbon black dispersion liquid, which an exhibit conductivity with a small amount of the carbon black, is produced in order to reduce an amount of the carbon black in a coating liquid, most types of the carbon black are neutral or alkaline, and have poor solubility to a polar solvent that is a solvent for polyamic acid. Therefore, there are problems that the amount of the carbon black is reduced to reduce viscosity and solid content, when a dispersion liquid or a coating material is produced.

SUMMARY OF THE INVENTION

The present invention aims to provide a polyimide seamless belt having a thickness of 60 μm or greater, which is a polyimide seamless belt produced by a method where a cylindrical metal mold is coated with a polyamic acid composition, and a number of molds for use and a number of steps to be performed are kept the minimum, and which is capable of exhibiting electric properties without impairing mechanical properties, and has an excellent surface quality without swelling or any defect in an appearance, such as rough surface (texture like zest of a citrus fruit).

The present inventors have diligently conducted researches and studies on a polyimide seamless belt containing high-structure carbon black. As a result, they have found that the aforementioned object can be achieved by using acidic carbon black in combination to improve the problems without impairing the advantages thereof, and adjusting amounts of the high-structure carbon black, and the acidic carbon black. Based on this insight, the present invention has been accomplished.

Specifically, the object of the present invention can be achieved by the "polyimide seamless belt" defined in the following (1).

(1) A polyimide seamless belt for an image forming apparatus, containing:
polyimide containing a segment derived from aromatic diamine, and a segment derived from aromatic tetracarboxylic acid; and
two types of carbon black, which are high-structure carbon black capable of imparting high conductivity, and acidic carbon black, where the two types of the carbon black are dispersed in the polyimide seamless belt,
wherein the polyimide seamless belt has surface resistivity of $10^8 \Omega/\square$ or less.

As it becomes clear from the following specific and concrete explanations, the present invention exhibits an extremely excellent effect that a polyimide seamless belt, which does not impair various properties, such as mechanical properties, and electric properties, can be provided.

DETAILED DESCRIPTION OF THE INVENTION

The present invention is specifically explained hereinafter.
The present invention relates to the "polyimide seamless belt" specified in (1). This "polyimide seamless belt" includes the embodiments of the "polyimide seamless belt" specified in the following (2) to (6), and the present invention, moreover, include "a production method of a polyimide seamless belt" and "an image forming apparatus" defined in the following (7) to (8). Therefore, these are also specifically explained as well as the polyimide seamless belt.

(2) The polyimide seamless belt according to (1), wherein a total amount of the two types of the carbon black in the polyimide seamless belt is 8% by weight to 23% by weight.
(3) The polyimide seamless belt according to (1) or (2), wherein the high-structure carbon black contained in the polyimide seamless bel has pH of 6 or higher.
(4) The polyimide seamless belt according to any one of (1) to (3), wherein an amount of the high-structure carbon black in the polyimide seamless belt is 3% by weight to 6% by weight.
(5) The polyimide seamless belt according to any one of (1) to (4), wherein the acidic carbon black contained in the polyimide seamless belt has pH of 4.5 or lower.
(6) The polyimide seamless belt according to any one of (1) to (5), wherein an amount of the acidic carbon black in the polyimide seamless belt is 5% by weight to 17% by weight.

(7) A production method of a polyimide seamless belt, containing:
preparing a polyimide precursor coating liquid, in which polyamic acid that is a polyimide precursor obtained through a reaction between aromatic diamine and aromatic tetracarboxylic acid, high-structure carbon black capable of imparting high conductivity, and acidic carbon black are dissolved or dispersed in an organic solvent;
forming a seamless belt shaped product having a predetermined thickness with the coating liquid; and
drying the seamless belt shaped product, followed by converting the polyamic acid into polyimide, to thereby produce a polyimide seamless belt having surface resistivity of $10^8 \Omega/\square$ or less,
wherein the polyimide seamless belt contains the polyimide containing a segment derived from the aromatic diamine, and a segment derived from the aromatic tetracarboxylic acid.

(8) An image forming apparatus, containing:
an electrostatic latent image forming unit configured to form an electrostatic latent image on an image bearer;
a developing unit configured to develop the electrostatic latent image formed on the image bearer with a toner to form a toner image;
a primary transfer unit configured to transfer the toner image from the image bearer onto an intermediate transfer member, where the intermediate transfer member may be a seamless belt;
a secondary transfer unit configured to transfer the toner image from the intermediate transfer member onto a recording medium; and
a fixing unit which is configured to fix the toner image on the recording medium and may contain a seamless belt member,
wherein at least one of the seamless belts used in the image forming apparatus is the polyimide seamless belt according to any one of (1) to (6).

The embodiments for carrying out the present invention are specifically explained hereinafter.

There are various methods for producing a coating material (also referred to as a coating liquid in the present invention) composed of a polyamic acid composition liquid and carbon black. In order to control addition amounts, a carbon black dispersion liquid containing a small amount of the polyamic acid composition liquid, a polar solvent, and carbon black is produced in advance, and the polyamic acid composition liquid is further added to the carbon black dispersion liquid to give the predetermined resistivity. The resultant is used as the coating material.

As for the carbon black having excellent dispersibility to a polar solvent, which is a solvent of the polyamic acid composition liquid, acidic carbon black has been known. Use of the acidic carbon black in the carbon black dispersion liquid can increase an amount of the carbon black in the polyamic acid composition liquid. In the case where it is tried to secure electric properties required for a seamless belt only with the acidic carbon black, the amount of the carbon black in the coating material needs to be increased significantly, which leads to significantly low mechanical strength thereof. When a dispersion liquid of high-structure carbon black (may be referred to as conductive carbon black hereinafter), which is known to exhibit conductivity with a small amount thereof, is produced in order to reduce an amount of the carbon black in a coating material, most types of high-structure carbon black are often neutral or alkaline, and the dispersibility of the carbon black to a polar solvent, which is a solvent for polyamic acid, is poor, as described earlier. Therefore, there is a problem that an amount of carbon black for use is small, and a viscosity and solid content are low, when a dispersion liquid or coating material is produced using such the carbon black.

In order to secure electric properties, mechanical properties, and surface quality, therefore, a dispersion liquid is produced by adding a small amount of polyamic acid to the acidic carbon black and the carbon black, a coating material is prepared by further blending an appropriate amount of polyamic acid with the dispersion liquid, and a seamless belt is produced with the coating material. As a result, it has been found that a seamless belt securing the aforementioned electric properties, mechanical properties, and surface quality is achieved.

A polyamic acid composition liquid, carbon black, and a polar solvent, which are constitutional components of a coating liquid for use in the present invention, and polyimide generated by performing a heat process (imidization) of the composition liquid are specifically explained hereinafter.

Typically, nonthermoplastic polyimide is highly heat resistant plastic obtained by a two-stage synthesis method via polyamic acid, or a polyamic acid derivative, which is formed from aromatic multivalent carboxylic anhydride or a derivative thereof, aromatic diamine, and an organic solvent. As the nonthermoplastic polyimide has a rigid main chain structure, the nonthermoplastic polyimide does not dissolve or melt in an organic solvent. Therefore, polyamic acid or a polyamic acid derivative, which is synthesized in advance by solution polymerization, is subjected to a shaping process, and then polyimide is synthesized by performing a dehydration concentration reaction during a heating process performed on the shaped polyamic acid or polyamic acid derivative. The reaction formula is presented below.

Reaction formula 1

In the reaction formula 1 above, $Ar^1$ is a tetravalent aromatic residue containing two carbon six-membered rings, and $Ar^2$ is a bivalent aromatic residue containing one carbon six-membered ring.

Specific examples of the aromatic multivalent carboxylic anhydride include ethylene tetracraboxylic dianhydride, cyclopentane tetracarboxylic dianhydride, pyromellitic dianhydride, 3,3',4,4'-benzophenone tetracarboxylic dianhydride, 2,2',3,3'-benzophenone tetracarboxylic dianhydride, 3,3',4,4'-biphenyltetracarboxylic dianhydride, 2,2',3,3'-biphenyltetracarboxylic dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,3,6,7-naphthalene tetracarboxylic dianhydride, 1,4,5,8-naphthalene tetracarboxylic dianhydride, 1,2,5,6-naphthalene tetracarboxylic dianhydride, 1,2,3,4-benzenetetracarboxylic dianhydride, 3,4,9,10-perylene tetracarboxylic dianhydride, 2,3,6,7-anthracene tetracarboxylic dianhydride, and 1,2,7,8-phenanthrene tetracarboxylic dianhydride. These may be used alone, or a mixture of two or more.

Specific examples of the aromatic diamine that is reacted with the aromatic multivalent carboxylic anhydride include m-phenylene diamine, o-phenylene diamine, p-phenylene diamine, m-aminobenzylamine, p-aminobenzylamine, 4,4'-diaminodiphenyl ether, 3,3'-diaminodiphenyl ether, 3,4'-diaminodiphenyl ether, bis(3-aminophenyl) sulfide, (3-aminophenyl) (4-aminophenyl) sulfide, bis(4-aminophenyl) sulfide, bis(3-aminophenyl) sulfide, (3-aminophenyl)(4-aminophenyl) sulfoxide, bis(3-aminophenyl) sulfone, (3-aminophenyl)(4-aminophenyl) sulfone, bis(4-aminophenyl) sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]-ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfoxide, bis[4-(4-aminophenoxy)phenyl]sulfoxide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 1,4-bis[4-(3-aminophenoxy)benzoyl]benzene, 1,3-bis[4-(3-aminophenoxy)benzoyl]benzene, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, bis[4-{4-(4-aminophenoxy)phenoxy}phenyl]sulfone, 1,4-bis[4-(4-aminophenoxy)phenoxy]-α,α-dimethylbenzyl]benzene, and 1,3-bis[4-(4-aminophenoxy)-α,α-dimethylbenzyl]benzene.

These may be used alone, or as a mixture of two or more. Moreover, polyamic acid (a polyimide precursor) can be attained by allowing about equal moles of the aromatic multivalent carboxylic anhydride component and the diamine component to react through a polymerization reaction in an organic polar solvent. In the present invention, polyamic acids may be mixed.

The effect of the present invention is enhanced when polyamic acid, which is turned into rigid polyimide after imidization, is used among various types of the polyamic acid composed of the aromatic multivalent carboxylic anhydride, and the aromatic diamine, and a mixture thereof.

Typically, aromatic polyimide has a benzene ring in a principle chain structure thereof, and has high sterical hinder. In case of polyamic acid having a bonding site capable of generating internal rotation in the structural skeleton thereof, such as an ether bond, or sulfide, in the molecular skeleton, crystallinity is slightly reduced by bends of the principle chain structure. Therefore, it is considered that gas permeability of a residual solvent, generated water, etc., is enhanced. In case of polyamic acid that does not have the bond, there is no internal rotation, a principle chain thereof is linear, and it has a rigid skeleton structure. As a result, crystallization or formation of an ordered structure tends to be formed, which leads to low gas permeability of a residual solvent, generated water, etc.

The polyamic acid that does not have a bond, preferably polyamic acid composed of 3,3',4,4'-biphenyltetracarboxylic dianhydride, and p-phenylene diamine, is particularly effective in the present invention.

[Production Method of Polyamic Acid]

A production method of polyamic acid is specifically explained hereinafter.

Examples of the organic polar solvent used in the polymerization reaction of polyamic acid include: a sulfoxide-based solvent, such as dimethyl sulfoxide, and diethyl sulfoxide; a formamide-based solvent, such as N,N-dimethylformamide, and N,N-diethylformamide; an acetoamide-based solvent, such as N,N-dimethylacetoamide, and N,N-diethylacetoamide; a pyrrolidone-based solvent, such as N-methyl-2-pyrrolidone, and N-vinyl-2-pyrrolidone; a phenol-based solvent, such as phenol, o-, m-, or p-cresol, xylenol, halogenated phenol, catechol; an ether-based solvent, such as tetrahydrofuran, dioxane, and dioxolane; an alcohol-based solvent, such as methanol, ethanol, and butanol; a cellosolve-based solvent, such as Butyl CELLOSOLVE (registered trade mark); hexamethylphotphoramide; and γ-butyrolactone. These may be used alone, or as a mixed solvent.

The solvent is not particularly limited, as long as the solvent can dissolve polyamic acid, but the solvent is particularly preferably N,N-dimethylacetoamide, or N-methyl-2-pyrrolidone.

As for an example of a production of the polyimide precursor, first, one or several types of diamines are dissolved in an organic solvent, or dispersed therein in the state of a slurry in an inert gas atmosphere, such as argon, and nitrogen. To the resulting solution, at least one type of the aforementioned aromatic multivalent carboxylic anhydride, or derivatives thereof (may be in a state of a solid, or a solution dissolved in an organic solvent, or slurry) are added. As a result, a ring-opening addition polymerization reaction is induced with generation of heat, and a viscosity of the solution is rapidly increased, to thereby yield a high-molecular-weight polyamic acid solution. It is preferred that the temperature for this reaction be controlled to typically in the range of −20° C. to 100° C., ideally in the range of 60° C. or lower. The reaction time is about 30 minutes to about 12 hours.

The example above is merely one example. In reverse to the order for adding in the reaction described above, first, aromatic multivalent carboxylic anhydride or a derivative thereof may be dissolved or scattered in an organic solvent, and the diamine may be added to the resulting solution. The diamine may be added in the state of a solid, a solution where the diamine is dissolved in an organic solvent, or a slurry.

Specifically, an order for mixing the acid dianhydride component, and the diamine component is not limited. Moreover, aromatic tetracarboxylic dianhydride and aromatic diamine may be added to an organic polar solvent at the same time to allow the aromatic tetracarboxylic dianhydride and the aromatic diamine to react.

As described above, a polyimide precursor solution is attained in a state where polyamic acid is homogeneously dissolved in an organic polar solvent, by performing a polymerization reaction of equal moles of aromatic multivalent carboxylic anhydride or a derivative thereof, and an aromatic diamine component in an organic polar solvent.

As for the polyimide precursor solution (polyamic acid composition liquid) for use in the present invention, the solution synthesized in the aforementioned manner can be used. In view of convenience, however, a commercially available product in the state where polyamic acid is dissolved in an organic solvent, so-called polyimide varnish, can be attained and used.

Typical examples thereof include TORAYNEECE (manufactured by TORAY INDUSTRIES, INC.), U-Varnish (manufactured by UBE INDUSTRIES, LTD.), OPTMER (manufactured by JSR Corporation), SE812 (manufactured by NISSAN CHEMICAL INDUSTRIES, LTD.), and CRC8000 (manufactured by Sumitomo Nakelite Co., Ltd.).

Moreover, examples of the product of a solvent soluble type include Ricacoat (New Japan Chemical Co., Ltd.), a block copolymer polyimide (PI Research Institute), and GPI (Gunei Chemical Industry Co., Ltd.).

A coating liquid is prepared by blending appropriately selected components to the synthesized polyamic acid solution, or the one selected from the commercial products. A support (a mold for shaping) is coated with the coating liquid, the coating liquid is casted, followed by a process, such as heating, to perform conversion (imidization) from the polyamic acid, which is a polyimide precursor, into polyimide.

Various additives may be optionally added to the polyamic acid composition in order to improve properties of a resulting belt or the polyamic acid composition, such as surface flatness, or leveling.

These additives are those generally known as a leveling agent, a defoaming agent, and coating film improving agent. Among them, the particularly preferable additive is a silicone-based additive. In case of a non-silicone additive, for example glycerin, higher fatty acid esters, higher alcohol boric acid esters, and fluorine-containing surfactants are preferably used. An amount of the additive is 0.001% by weight to 1% by weight relative to the total weight of the components constituting the polyimide seamless belt.

As for a method for converting polyamic acid to polyimide, imidization can be performed by (1) a method containing only firing, or (2) a chemical method.

(1) The method containing only firing is a method where polyamic acid is converted into polyimide by performing a firing process on the polyamic acid at 200° C. to 350° C., and is a simple and practical method for attaining polyimide (polyimide resin). On the other hand, (2) the chemical method is a method where polyamic acid is reacted with a cyclohydration reagent (a mixture of carboxylic anhydride, and tertiary amine), followed by performing a heat treatment to completely imidize the polyamic acid. Since (2) the chemical method is more complicated and more costly than (1) the method containing only firing, (1) the method is typically often used.

Recently, a method, which is one type of (2) the method, and contains adding, as a catalyst, primary to tertiary aromatic amine (e.g., imidazole, and quinolone) to a varnish, to accelerate imidization during firing, is often used. In order to exhibit inherent performance of polyimide, it is necessary to complete imidization by firing at the temperature equal to or higher than glass transition temperature of resulting polyimide. However, the aforementioned method can accelerate imidization at the lower temperature, and also improve mechanical durability of a resultant.

[High-Structure Carbon Black]

Next, materials suitably used for the polyimide seamless belt of the present invention, other than the polyimide material, are explained hereinafter.

In the present invention, carbon black having the pH of 6 or higher, the DBP oil absorption of 150 cm$^3$/100 g or greater is preferably used as high-structure carbon black (conductive carbon black). As described below, in the present invention, a dispersion liquid is produced by blending the carbon black, polyamic acid, and a polar solvent. Moreover, it has been found that the surface resistivity of a resulting polyimide seamless belt can be appropriately adjusted to $10^8 \Omega/\square$ or less by adjusting addition of the conductive carbon black so that an amount of the conductive carbon black in a coating material is to be 3% by weight or greater.

In the present specification, the "conductive carbon black" means high-structure carbon black having high effect of imparting conductivity, capable of reducing resistivity with a small amount thereof. As for the conductive carbon black, carbon black, which gives a resulting polyimide seamless belt a surface resistivity of $10\Omega/\square$ to $10^8\Omega/\square$, when an amount of the carbon black in a coating film is 6% by weight or less, is preferably used.

A reason why conductivity becomes high when the DBP oil absorption of the conductive carbon black used in the present invention is 150 cm$^3$/100 g or greater is as follows. The DBP oil absorption is a numerical value indicating a degree of development (structure) of aggregates formed with the deposited carbon black, and is calculated to determine the oil absorption capacity (cm$^3$/100 g) of dibutyl phthalate (DBP) required for filling gaps between the aggregates, which are associated with connections between particles. Alternatively, the DBP oil absorption is a value indicating a degree of a structure due to aggregations. When this value is large, the carbon black is typically called high-structure carbon black, which can impart conductivity with a small amount thereof.

Moreover, a reason why conductivity becomes high when the pH of the conductive carbon black used in the present invention is 6 or greater is as follows. Carbon black (furnace carbon black) produced by a furnace method which performs an oxidization treatment is provided with a functional group (e.g., a carboxyl group, a ketone group, a lactone group, and a hydroxyl group) containing oxygen at a surface thereof as a result of the treatment. It is therefore assumed that it is difficult to form conductive channels, and thus use of such the conductive carbon black prevents reduction in resistance.

In the present invention, moreover, an amount of the conductive carbon black in the coating film is preferably 3% by weight or greater, more preferably 3% by weight to 6% by weight, and even more preferably 3% by weight to 5% by weight. By using the conductive carbon black in an amount of the aforementioned range in combination with the acidic carbon black, the electric resistance is relatively easily controlled to $10\Omega/\square$ to $10^8\Omega/\square$ without impairing the aforementioned advantages. When it was adjusted as the polyamic acid composition, reduction in the viscosity of the coating material is prevented, and a cylindrical metal mold can be coated with the coating material.

When the amount of the carbon black is extremely small, an effect of adjusting to the set electric resistance cannot be attained sufficiently, and thus it is difficult to set the electric resistance to the range.

When the amount of the carbon black is extremely large, moreover, dispersion cannot be secured stably. As a result, the solid content and the viscosity of the coating liquid are significantly reduced, which may cause dripping of the coating liquid, when the coating liquid is applied to a metal mold. Therefore, a film thickness of a resulting belt becomes uneven, which is not preferable in view of running stability.

As for the aforementioned conductive carbon black, for example, commercial products, such as #3050B (pH: 7.0), #3400B (pH: 6.5) (both manufactured by Mitsubishi Chemical Corporation); TOKABLACK #5500 (pH: 7.0), TOKABLACK #4500 (pH: 6.0) (both manufactured by TOKAI CARBON CO., LTD.); KETJENBLACK EC600JD (pH: 9.0), KETJENBLACK EC300J (pH: 9.0) (both manufactured by Lion Corporation); and DENKABLACK (pH: 9.0 to 10.0) (manufactured by DENKI KAGAKU KOGYO KABUSHIKI KAISHA), can be used.

Moreover, carbon black produced for the present purpose, such as the carbon black having the aforementioned properties, can be used.

[Acidic Carbon Black]

In the present invention, the term "acidic carbon black" means carbon black the pH of which is 4.5 or lower. An amount of the acidic carbon black in the coating film is preferably 5% by weight to 17% by weight, more preferably 5% by weight to 15% by weight, and even more preferably 7% by weight to 10% by weight. When the amount of the acidic carbon black is less than 5% by weight, sufficient gas permeability cannot be attained, and defects in the external appearance thereof are often formed. When the amount thereof is greater than 17% by weight, the mechanical strength of a resulting belt is low, and thus it is not preferable on practical use.

Use of the aforementioned acidic carbon black can produce a polyamic acid composition liquid having excellent dispersion stability. It has been found that an effect of evaporating the solvent can be attained without adversely affecting mechanical strength of a resulting belt, by adjusting an amount of the acidic carbon black in the coating film to the range of 5% by weight to 17% by weight.

A reason why a polyamic acid composition liquid having excellent dispersion stability can be produced when the pH of the acidic carbon black is 4.5 or lower is as follows. Many acidic groups, which affect the pH, are present in the acidic carbon black, and therefore affinity of the carbon black particles to a polar solvent, which is a solvent of a film forming liquid, is increased so that the carbon black particles can be finely dispersed. It is assumed that, as a result of the above, dispersion uniformity is improved.

In the present invention, moreover, the acidic carbon black content in the coating film is preferably 5% by weight to 17% by weight, more preferably 5% by weight to 15% by weight, and even more preferably 7% by weight to 10% by weight. As the amount of the acid carbon black is adjusted in the range of 5% by weight to 17% by weight, mechanical strength of a resulting polyimide seamless belt is not significantly affected. A reason for this is as follows. Typically, inorganic fillers, including carbon black, dispersed in a resin material impair associations or bonds between resin molecules. Therefore, it is assumed that mechanical strength becomes low, as a volume of the inorganic fillers increases, namely mechanical strength defective parts increase.

As for the acidic carbon black having the pH of 4.5 or less, for use in the present invention, for example, usable are a commercial product, and examples of the commercial product include: Special Black 5 (pH: 3.0), Special Black 4 (pH: 3.0), Special Black 550 (pH: 2.8), Special Black 350 (pH: 3.5), Special Black 250 (pH: 3.1), Special Black 100 (pH: 3.3), Special Black 4A (pH: 3.0), PRINTEX150T (pH: 4.0), Color Black FW1 (pH: 4.5), Color Black FW18 (pH: 4.5), Color Black S170 (pH: 4.5), Color Black S160 (pH: 4.5), Printex U (pH: 4.5) (all manufactured by Evonik Industries AG); MA7 (pH: 3.0), MA77 (pH: 2.5), MA8 (pH: 3.0), MA11 (pH: 3.5), MA100 (pH: 3.5), MA100R (pH: 3.5), MA230 (pH: 3.0), MA220 (pH: 3.0), (all manufactured by Mitsubishi Chemical Corporation); and RAVEN1255 (pH: 3.0 to 3.5), RAVEN3500 (pH: 3.0 to 3.5), RAVEN7000 (pH: 3.0 to 3.5) (manufactured by Birla Carbon). Moreover, carbon black produced for this purpose is also usable.

[Total Amount (Content) of Carbon Black]

A total amount of the carbon black used and contained in the seamless belt of the present invention is preferably 8% by weight to 23% by weight, more preferably 8% by weight to 20% by weight, and even more preferably 12% by weight to 15% by weight. When the amount thereof is less than 8% by weight, a defect in an external appearance of the seamless belt is caused, and a sufficient effect cannot be attained. When the amount thereof is greater than the 23% by weight, a mechanical strength of a resulting belt is insufficient, and sufficient properties cannot be attained.

In the present invention, a formulation of the high-structure carbon black and the acidic carbon black is adjusted in the aforementioned range to impart a resulting polyimide seamless belt with a surface resistivity of $10\Omega/\square$ to $10^8\Omega/\square$. This adjustment is preferable, as mechanical properties of the polyimide seamless belt are also satisfied. The surface resistivity of the polyimide seamless belt is more preferably $10\Omega/\square$ to $10^5\Omega/\square$. When the surface resistivity is the aforementioned range, generation of static electricity is suppressed in an electrophotographic image forming apparatus, and excellent properties of the belt are sufficiently exhibited.

A thickness of the polyimide seamless belt of the present invention is 60 µm or greater, but preferably less than 120 µm. The thickness thereof is more preferably 60 µm to 100 µm.

When the thickness of the polyimide seamless belt is less than 60 µm, mechanical strength of the belt is low, and thus the belt tends to be torn, such as by splitting, and reduces resistance. When the film thickness of the belt is too thick, particularly 120 µm or greater, toughness thereof is low, and thus there is a problem in terms of durability.

Moreover, it is preferred that unevenness of the film thickness be avoided in order to enhance running stability.

As for a process for dispersing the carbon black, there is a method where carbon black is directly dispersed and mixed in the polyamic acid composition liquid, or a method where carbon black is dispersed in a solvent in advance, and the resulting dispersion liquid is mixed with the polyamic acid composition liquid. Note that, these are merely examples, and not limited to these methods.

For example, carbon black, and a small amount of a polyamic acid composition liquid are mixed with N-methyl-2-pyrrolidone, followed by dispersing the resulting mixture for the predetermined period by means of a ball mill, a paint shaker, or a bead mill using zirconia beads. After dispersing the mixture to give dispersed elements having certain particle diameters, the resulting liquid is taken out and provided as a carbon black dispersion liquid.

A polyamic acid composition liquid is mixed with the carbon black dispersion liquid to dilute to give the predetermined carbon black concentration.

As for a method for the mixing, mixing can be performed by means of a centrifugal stirrer, HENSCHEL MIXER, a homogenizer, or a planetary stirrer. Since a lot of foams are generated in the solvent after the stirring, it is preferred that the foams in the liquid be removed by a vacuum defoaming machine or a similar device.

As for a process for producing the coating liquid, moreover, a coating liquid may be produced by mixing a polyamic acid composition liquid and a polar solvent with the carbon black, followed by optionally further mixing a leveling agent or a curing accelerator, as necessary. In this case, a belt having a thickness of 60 µm or greater is easily produced by adjusting the viscosity of the coating liquid to the range of 1 Pa·s to 8 Pa·s, preferably the approximate range of 2 Pa·s to 5 Pa·s.

As for a method for the mixing, similarly to the production of the dispersion liquid of the carbon black, mixing can be performed by means of a centrifugal stirrer, HENSCHEL MIXER, a homogenizer, or a planetary stirrer. Since a lot of foams are generated in the solvent after the stirring, it is preferred that the foams in the liquid be removed by a vacuum defoaming machine or a similar device.

Next, a method for producing a seamless belt using a coating liquid containing polyamic acid is explained. For example, the seamless belt can be produced as follows.

The polyimide seamless belt of the present invention can be produced by a method containing:

dispersing carbon black in polyamic acid to produce a carbon black dispersion liquid;

producing a coating/casting liquid (coating liquid) with adjusting a blended amount of the carbon black dispersion liquid to include a certain amount of the carbon black thereof;

applying the coating/casting liquid to a cylindrical metal mold (support) for shaping through coating or casting;

removing the solvent in a coating film formed on the support by coating or casting, through heating to dry;

firing the coating film to imidize the polyimide precursor contained in the coating film through heating; and releasing a formed thin film from the support.

A process for applying the coating/casting liquid is explained next.

A predetermined amount of the coating material is applied to the cylindrical metal mold (support) for shaping to give the aforementioned thickness of a seamless belt after firing, to form a film. Alternatively, the coating/casting liquid is thinly applied a few times to give the aforementioned predetermined thickness, to thereby form a film. As for a method for forming a film on a mold (support, there are centrifugal forming, roller coating, blade coating, ring coating, dipping, spray coating, dispenser coating, and die coating. As for a method for forming a seamless belt of polyimide, centrifugal forming is often used. In this method, however, a film is formed on an internal surface of a support, and if layers are laminated on a surface thereof, the process becomes complicated, because it is necessary to release the film from the mold once after the film formation, and the film is transferred into another mold for imidization.

In the present invention, a film may be formed on an inner surface or outer surface of a mold. It is preferred that a film be formed on an outer surface of a support having high surface smoothness, by coating through roll coating, dispenser coating, ring coating, or die coating.

The coating liquid containing the polyamic acid is applied to give the predetermined film thickness on the external surface of a metal cylindrical support, to which a release agent is applied by the aforementioned method in advance, followed by drying the coating film by a hot air drier, an IH heater, or an IR heater.

As for drying and curing of the polyamic acid coating liquid, first, the polyamic acid coating liquid may be dried at temperature of about 80° C. to about 150° C. for 10 minutes to 60 minutes, followed by heating at a heating rate of about 2° C./min to about 5° C./min to perform imidization firing at 300° C. to 400° C.

[Image Forming Apparatus]

One example of the image forming apparatus of the present invention is explained with reference to drawings.

Figure 1:
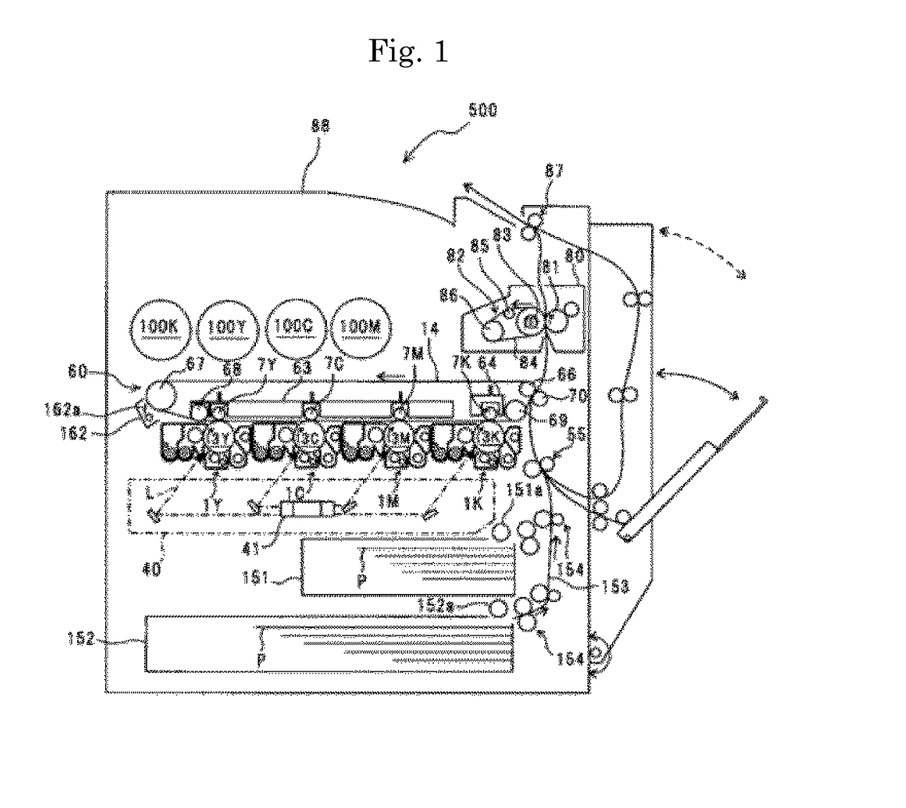
FIG. 1 is a diagram for explaining one example of the image forming apparatus of the present invention.

FIG. 1 is a schematic diagram illustrating one example of the image forming apparatus 500 of the present invention. The image forming apparatus 500 is equipped with four image formation units 1Y, 1C, 1M, 1K, of yellow, magenta, cyan, black (may be referred to as Y, C, M, K hereinafter). The image formation units 1Y, 1C, 1M, 1K have the same structure, provided that a different color of a toner, (e.g., Y toner, C toner, M toner, and K toner) is used as an image forming material that forms an image.

A transfer unit 60 equipped with an intermediate transfer belt 14 is provided at the upper side of the image formation units 1Y, 1C, 1M, 1K. Toner images of the aforementioned colors formed on surfaces of the photoconductors 3Y, 3C, 3M, 3K contained in the image formation units 1Y, 1C, 1M, 1K are transferred and superimposed on a surface of the intermediate transfer belt 14.

Moreover, a light-writing unit 40 is arranged at the bottom side of the four image formation units 1. The light-writing unit 40 serving as a latent image forming unit is configured to irradiate each of photoconductors 3Y, 3C, 3M, 3K of the image formation units 1Y, 1C, 1M, 1K with laser light L based on image information. As a result, electrostatic latent images for Y, C, M, K are formed on the photoconductors 3Y, 3C, 3M, 3K, respectively. Note that, the light-writing unit 40 is configured to apply laser light L emitted from a light source to the photoconductors 3Y, 3C, 3M, 3K through a plurality of optical lenses or mirrors, while polarizing the light with a polygon mirror 41 that is rotationally driven by a motor. As well as the structure mentioned above, a system where light scanning is performed by an LED array can be also employed.

At the bottom of the light-writing unit 40, a first paper feeding cassette 151 and a second paper feeding cassette 152 are arranged in a manner that they are overlapped in the vertical direction. In each of the first paper feeding cassette 151 and the second paper feeding cassette 152, recording media P are housed in the state of a paper bundle where a plurality of sheets are stacked. A recording medium P placed on the top in each cassette is in contact with a first paper feeding roller 151a and a second paper feeding roller 152a, respectively. Once the first paper feeding roller 151a is rotationally driven in the anticlockwise direction (in FIG. 2) of the diagram by a driving unit (not illustrated), a recording medium P placed on top in the first paper feeding cassette is discharged to a paper feeding path 153 arranged in the vertical direction at the right side (in FIG. 2) of the first paper feeding cassette 151. Once the second paper feeding roller 152a is rotationally driven in the anticlockwise direction (FIG. 1) of the diagram by a driving unit (not illustrated), moreover, a recording medium P placed on top in the second paper feeding cassette 152 is discharged to the paper feeding path 153.

Pluralities of a pair of convey rollers 154 are arranged in the paper feeding path 153. The recording medium P sent to the paper feeding path 153 is conveyed from the bottom to the top (in FIG. 1) within the paper feeding path 153 in the drawing with being nipped with the pair of the convey rollers 154.

A pair of registration rollers 55 is provided at the downstream end part of the paper feeding path 153 relative to the traveling direction of the recording medium P. Once the pair of the registration rollers 55 nip therebetween the recording medium P transported from the pair of the convey rollers 154, the rotation of the pair of the convey rollers 154 is stopped temporarily. Then, the recording medium P is sent to the below-mentioned secondary transfer nip at the appropriate timing.

Figure 2:
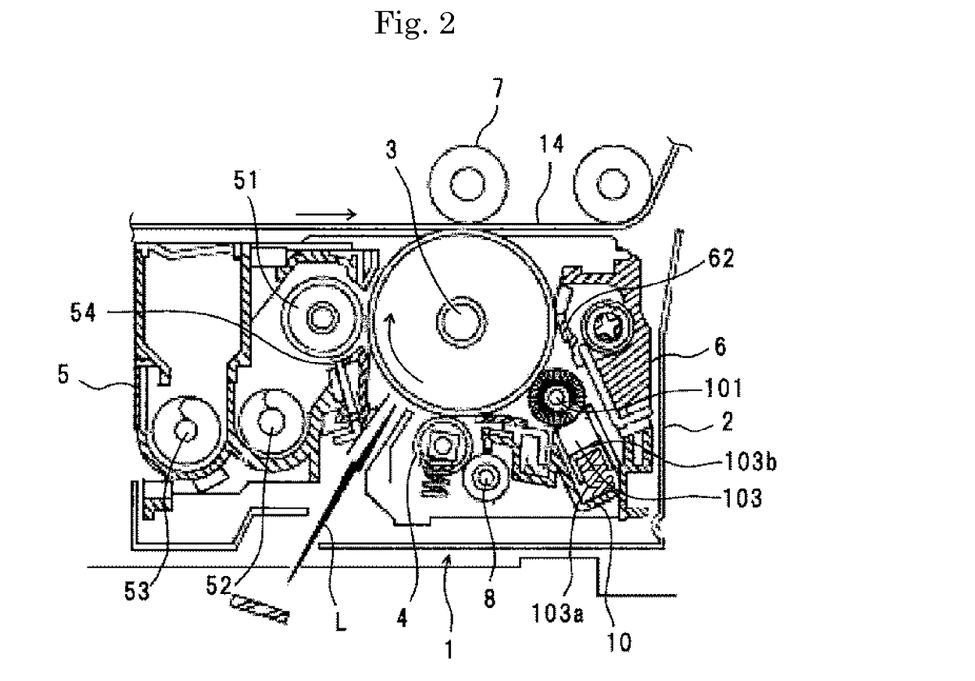
FIG. 2 is a diagram for explaining the engine part in the image forming apparatus of FIG. 1.

FIG. 2 is a schematic diagram illustrating a schematic structure of one of the four image formation units 1.

As illustrated in FIG. 2, the image formation unit 1 is equipped with a drum-shaped photoconductor 3 as an image bearer. Although the photoconductor 3 is in the shape of a drum, the photoconductor may be a sheet-type photoconductor or an endless belt-type photoconductor.

In the surrounding area of the photoconductor 3, a charging roller 4, a developing device 5, a primary transfer roller 7, a cleaning device 6, a lubricant coating device 10, and a charge neutralization lamp (not illustrated) are provided. The charging roller 4 is a charging member equipped in a charging device, as a charging unit. The developing device 5 is a developing unit configured to develop an electrostatic latent image formed on a surface of the photoconductor 3 with a toner to form a toner image. The primary transfer roller 7 is a primary transfer member equipped in a primary transfer device, which is configured to transfer the toner image formed on a surface of the photoconductor 3 to an intermediate transfer belt 14. The cleaning device 6 is a cleaning unit configured to clean the toner remained on the surface of the photoconductor 3, from which the toner image has been transferred to the intermediate transfer belt 14. The lubricant coating device 10 is a lubricant coating unit configured to apply a lubricant onto the cleaned surface of the photoconductor 3. The charge neutralization lamp (not illustrated) is a charge neutralization unit configured to neutralize the surface potential of the cleaned photoconductor 3.

The charging roller 4 is provided in a non-contact manner, with a certain space to the photoconductor 3, and is configured to charge the photoconductor 3 with the predetermined polarity and predetermined potential. The surface of the photoconductor 3 uniformly charged by the charging roller 4 is irradiated with laser light L emitted from the light-writing unit 40 serving as a latent image formation unit, based on image information, to thereby form an electrostatic latent image.

The developing device 5 contains a developing roller 51 serving as a developer bearer. To the developing roller 51, developing bias is applied from a power source (not illustrated). In a casing of the developing device 5, provided are a supply screw 52 and a stirring screw 53, which are configured to stir a developer housed in the casing, white transporting in the mutually different directions. Moreover, also provided is a doctor 54 configured to regulate the developer held on the developing roller 51. The toner in the developer stirred and transported by the supply screw 52 and the stirring screw 53 is charged to the predetermined polarity. The developer is then scooped on a surface of the developing roller 51, the scooped developer is regulated by the doctor 54, and the toner is deposited on an electrostatic latent image formed on a surface of the photoconductor 3 in the developing region facing to the photoconductor 3.

The cleaning device 6 contains a fur brush 101, or a cleaning blade 62. The cleaning blade 62 is composed of a plate-shaped supporting member 621 formed of a rigid material (e.g., metal, and hard plastic), and a plate-shaped elastic member 622. The elastic member 622 is fixed on one end of the supporting member 621 with an adhesive or the like, and the other end of the supporting member 621 is supported with a case of the cleaning device 6 in a manner of a cantilever.

The cleaning blade 62 is composed of the supporting member 621, and the plate-shaped elastic member 622 one end of which is connected to the supporting member, and the other end of which contains a free end portion having a predetermined length. The cleaning blade 62 is provided in the manner that the abutment part 62c of the elastic member 622, which is the end containing the free end, is brought into contact with a surface of the image bearer 3 along the longitudinal direction thereof. The cleaning blade 62 is in contact with the photoconductor 3 in the counter direction relative to the surface traveling direction of the photoconductor 3.

The lubricant coating device 10 is equipped with a solid lubricant 103 and a lubricant press spring 103a, and is further equipped with a fur brush 101 configured to apply the solid lubricant 103 on a surface of the photoconductor 3. The solid lubricant 103 is held by a bracket 103b, and is pressed to the side of the fur brush 101 by the lubricant press spring 103a. Then, the solid lubricant 103 is scraped with the fur brush 101, which rotates in the dragging direction relative to the rotational direction of the photoconductor 3, and the scraped lubricant is applied to the surface of the photoconductor 3. As a result, the friction coefficient of the surface of the photoconductor 3 is maintained to 0.2 or less, when an image is not formed.

Note that, the charging device is that of a non-contact adjacent setting type, where the charging roller 4 is provided adjacent to the photoconductor 3. However, the charging device may have a conventional structure, such as corotron, scorotron, and a solid state charger. Among these charging systems, a contact charging system or an adjacent arrangement system of non-contact manner are particularly preferable, as there are merits such as high charging efficiency, a low generation amount of ozone, and a minimized size of a device.

As for a light source of laser light L of the light-writing unit 40, or a light source of the charge neutralization lamp, general emitting bodies, such as a fluorescent lamp, a tungsten lamp, a halogen lamp, a mercury lamp, a sodium lamp, a light-emitting diode (LED), a laser diode (LD), and an electroluminescent (EL) lamp, can be used.

Various filters, such as a sharp-cut filter, a band filter, a near infrared-cut filter, a dichroic filter, an interference filter, and a color temperature conversion filter, can be used in order to apply only light of the desired wavelength range.

Among these light sources, preferred are a light-emitting diode (LED) and a laser diode (LD), because they can apply light having a wavelength of 600 nm to 800 nm.

The transfer unit 60 serving as a transfer unit illustrated in FIG. 1 is equipped with a belt cleaning unit 162, a first bracket 63, and a second bracket 64, as well as an intermediate transfer belt 14.

Moreover, the transfer unit 60 is further equipped with four primary transfer rollers 7Y, 7C, 7M, 7K, a secondary transfer back-up roller 66, a driving roller 67, a support roller 68, and a tension roller 69. The intermediate transfer belt 14 is endlessly rotated in an anticlockwise direction in FIG. 1 by the rotational driving of the driving roller 67, while supported by the eight rollers, i.e., the primary transfer rollers 7Y, 7C, 7M, 7K, the secondary transfer back-up roller 66, the driving roller 67, the support roller 68, and the tension roller 69. The primary transfer rollers 7Y, 7C, 7M, 7K nip the intermediate transfer belt 14, which is endlessly rotated in the aforementioned manner, with the photoconductors 3Y, 3C, 3M, 3K, respectively, to thereby form primary transfer nips, respectively. Then, a transfer bias having an opposite polarity (e.g., positive charge) to that of the toner is applied to the back surface of the intermediate transfer belt 14 (the internal perimeter surface of the loop). In the process that the intermediate transfer belt 14 successively passes through the primary transfer nips for Y, C, M, K, the Y, C, M, K toner images formed on the surfaces of the photoconductors 3Y, 3C, 3M, 3K are superimposed on the outer surface of the intermediate transfer belt 14 to thereby perform primary transfer. As a result, a toner image composed of superimposed 4 colors (may be referred to as a "four-color toner image" hereinafter) is formed on the intermediate transfer belt 14.

The secondary transfer back-up roller 66 nips the intermediate transfer belt 14 with the secondary transfer roller 70 provided at the outer side of the loop of the intermediate transfer belt 14, to thereby form a secondary transfer nip. A pair of the registration rollers 55 sends a recording medium P, which has been nipped between the pair of the registration rollers 55, to the secondary transfer nip at timing to synchronize to the four-color toner image formed on the surface of the intermediate transfer belt 14. The four-color toner image formed on the surface of the intermediate transfer belt 14 of the present invention is secondary transferred to the recording medium P in the secondary transfer nip by influences of a secondary transfer electric field formed between the secondary transfer roller 70 and the secondary transfer back-up roller 66, to which secondary transfer bias is applied, or nip pressure. In combination of white of the recording medium P, the full-color toner image is formed.

The toner, which has not been transferred to the recording medium P, is deposited on the intermediate transfer belt 14 of the present invention, which has passed through the secondary transfer nip. The residual toner on the intermediate transfer belt 14 is cleaned by a belt cleaning unit 162. Note that, the belt cleaning unit 162 is configured to scrape and remove the residual toner remained on the intermediate transfer belt 14 without being transferred with a belt cleaning blade 162a that is provided to be in contact with the outer surface of the intermediate transfer belt 14.

The first bracket 63 of the transfer unit 60 is rocked at the predetermined rotational angle by on-off driving of a solenoid (not illustrated) with the rotational axis of the support roller 68 as a center. In the case where the 500 forms a monochromic image, the first bracket 63 is rotated only a little in an anti-clockwise direction in FIG. 1 by the driving of the solenoid. Specifically, the intermediate transfer belt 14 is separated from the photoconductors 3Y, 3C, 3M by rotating the primary transfer rollers 7Y, 7C, 7M for Y, C, M in the anticlockwise direction in FIG. 1 with the rotational axis of the support roller 68 being a center. Then, a monochromic image is formed by driving only the image formation unit 1K among the four image formation units 1Y, 1C, 1M, 1K. As a result, consumptions of other members, which will be caused by driving the image formation units 1Y, 1C, 1M, can be avoided, when a monochromic image is formed.

The fixing unit 80 is arranged at the upper side of the secondary transfer nip. The fixing unit 80 is equipped with a press heat roller 81, which includes therein a heat source, such as a halogen lamp, and a fixing belt unit 82. The fixing belt unit 82 has a fixing belt 84, which is the seamless belt of the present invention and serves as a fixing member, a heat roller 83, which includes therein a heat source, such as a halogen lamp, a tension roller 85, a driving roller 86, and a temperature sensor (not illustrated). The endless fixing belt 84 travels in an anticlockwise direction in FIG. 1, with supported by the heat roller 83, the tension roller 85, and the driving roller 86. In this endless rotation, the fixing belt 84 is heated from the side of the back surface by the heat roller 83. The press heat roller 81, which is rotationally driven in the clockwise direction in FIG. 1, is brought into contact with the surface of the fixing belt 84 at the position where the fixing belt 84 is supported by the heat roller 83. As a result, a fixing nip, at which the press heat roller 81 and the fixing belt 84 are brought into contact with each other, is formed.

The temperature sensor (not illustrated) is provided at the outer side of the loop of the fixing belt 84 in the manner that, the temperature sensor faces to the surface of the fixing belt 84 (the outer perimeter of the loop) with the predetermined space, and the temperature sensor detects the surface temperature of the fixing belt 84 just before entering the fixing nip. The detected result is sent to the fixing power source circuit (not illustrated).

The fixing power source circuit controls, with on-off, a heat source included in the heat roller 83, or a heat source included in the press heat roller 81, based on the detected result of the temperature sensor.

Meanwhile, the recording medium P passed through the secondary transfer nip P is separated from the intermediate transfer belt 14, followed by sending the recording medium P into the fixing unit 80. The recording medium P is then nipped at the fixing nip in the fixing unit 80 to be transported from the bottom side to the upper side in FIG. 1. In this process, the recording medium P is heated, as well as pressed by the fixing belt 84, to thereby fix the full-color toner image onto the recording medium P.

The recording medium P, to which the toner is fixed, is passed through a pair of paper ejection rollers 87, and is then discharged outside the apparatus. A stacking unit 88 is formed on the top surface of the housing of the main body of the image forming apparatus 500. The recording media P discharged outside the apparatus by the pair of the paper ejection roller 87 are sequentially stacked in the stacking unit 88.

Toner cartridges 100Y, 100C, 100M, 100K, each configured to house therein a toner, are provided above the transfer unit 60. The four toners in the toner cartridges 100Y, 100C, 100M, 100K are appropriately supplied to the developing devices 5Y, 5C, 5M, 5K, respectively. The toner cartridges 100Y, 100C, 100M, 100K are mounted independently to the image formation units 1Y, 1C, 1M, 1K, and can be detachably mounted in the main body of the image forming apparatus.

Next, image forming operations performed with the image forming apparatus 500 are explained.

Once a signal for a print execution from an operation unit (not illustrated) is received, first, the predetermined voltage or electric current is applied to the charging roller 4 and the developing roller 51 successively at the predetermined timings. Similarly, the predetermined voltage or electric current is applied to a light source of the exposure unit 40 and a light source of the charge neutralization lamp successively at the predetermined timings. In the synchronized motions to this, the photoconductor 3 is rotationally driven in the direction shown with the arrow in FIG. 2 by a photoconductor driving motor (not illustrated).

Once the photoconductor 3 is rotated in the direction shown with the arrow in FIG. 1, a surface of the photoconductor 3 is uniformly charged to the predetermined potential by the charging roller 4. Then, laser light L corresponding to image information is applied from the light-writing unit 40 onto the photoconductor 3. As a result, the area of the surface of the photoconductor 3, to which the laser light L is applied, is discharged, to thereby form an electrostatic latent image.

The surface of the photoconductor 3, on which the electrostatic latent image has been formed, is rubbed by a magnetic brush, which is composed of a developer and formed on the developing roller 51, in the region facing to the developing device 5. In this operation, the charged toner on the developing roller 51 is transported to the side of the elastic latent image by the predetermined developing bias applied to the developing roller 51, to thereby develop (visualize) the electrostatic latent image. The similar image formation process is performed in each image formation unit 1, toner images of Y, C, M, K are formed on the surfaces of the photoconductors 3Y, 3C, 3M, 3K of the image formation units 1Y, 1C, 1M, 1K, respectively.

As mentioned above, the electrostatic latent image formed on the surface of the photoconductor 3 is reverse developed with the negatively-charged toner by the developing device 5 in the image forming apparatus 500. In the present embodiment, an N/P (negative-positive: a toner is deposited on the area where the potential is low) non-contact charging roller system where a toner is deposited on an area having the lower potential is explained above, but a system for use is not limited to the aforementioned system.

The toner images of respective colors formed on the surfaces of the photoconductors 3Y, 3C, 3M, 3K are sequentially primary transferred so that they are superimposed on a surface of the intermediate transfer belt 14. As a result, the four-color toner image is formed on the surface of the intermediate transfer belt 14.

The four-color toner image formed on the intermediate transfer belt 14 is transferred to a recording medium P, which is fed from the first paper feeding cassette 151 or the second paper feeding cassette 152, and is fed to the secondary transfer nip with going through between the pair of the registration rollers 55. During this operation, the recording medium P is temporarily stopped with being nipped between the pair of the registration rollers 55, is synchronized with the edge of the image on the intermediate transfer belt 14, and is supplied to the secondary transfer nip. The recording medium P, to which the toner image has been transferred, is separated from the intermediate transfer belt 14, and is sent to the fixing unit 80. As the recording medium P, to which the toner image has been transferred, passes through the fixing unit 80, the toner image is fixed on the recording medium P by heat and pressure. The recording medium P, to which the toner image has been fixed, is discharged outside the image forming apparatus 500, and is stacked in the stacking unit 88.

Meanwhile, the toner remained on the surface of the intermediate transfer belt 14, from which the toner image has been transferred to the recording medium P at the secondary transfer nip, is removed by the belt cleaning unit 162.

Moreover, the toner remained on the surface of the photoconductor 3, from which the toner image has been transferred to the intermediate transfer belt 14 at the primary transfer nip, has been removed by the cleaning device 6. Thereafter, a lubricant is applied to the surface of the photoconductor 3 by the lubricant coating device 10, followed by discharging the surface thereof by the charge neutralization lamp.

The image formation unit 1 of the image forming apparatus 500 is composed of the photoconductor 3, and as a process units, the charging roller 4, the developing device 5, the cleaning device 6, and the lubricant coating device 10, all of which are housed in a frame body 2, as illustrated in FIG. 2. The image formation unit 1 is detachably mounted, as a process cartridge, in the main body of the image forming apparatus 500. In the image forming apparatus 500, the image formation unit 1 has a configuration that the photoconductor 3 and the process units are integratedly exchanged as a process cartridge. However, a configuration for use may be a configuration where the photoconductor 3, the charging roller 4, the developing device 5, the cleaning device 6, and the lubricant coating device 10 are individually exchanged per unit.

As for the toner used in the image forming apparatus 500, a polymerization toner produced by suspension polymerization, emulsion polymerization, or dispersion polymerization is preferably used in view of an improvement in image quality, high circularity, and small particle diameters thereof. In order to form an image of high resolution, a polymer toner having the average circularity of 0.97 or greater, and the volume average particle diameter of 5.5 μm or less is preferably used.

EXAMPLES

The present invention is more specifically explained through examples hereinafter, but these examples shall not be construed as to limit the scope of the present invention in any way. Moreover, embodiments, which are made by appropriately modified the examples within the spirit of the present invention, are also included in the scope of the present invention.

[Shaping Method of Belt]

A cylindrical metal support having an outer diameter of 80 mm, and a length of 450 mm, an outer surface of which had been roughened by blasting, was used as a mold. The cylindrical support was set in a roller coating device. Subsequently, a coating liquid was poured into a pan, the coating liquid was drew up with a coating roller at the rotational speed thereof of 40 mm/sec, and a thickness of the coating liquid on the coating roller was controlled by adjusting a gap between a regulating roller and the coating roller to 0.6 mm. The cylindrical support was moved close to the coating roller with controlling the rotational speed of the cylindrical support to 35 mm/sec, and the coating liquid on the coating roller was uniformly applied onto the cylindrical support through transfer coating, with keeping a gap between the cylindrical support and the coating roller 0.4 mm. Thereafter, the cylindrical support was placed into a hot air circulating drying oven with maintaining rotations thereof, the temperature was gradually elevated to 110° C. to heat the cylindrical support for 30 minutes, and the temperature was further elevated to heat the cylindrical support at 200° C. for 30 minutes, followed by stopping the rotation. Thereafter, the resultant was introduced into a heating furnace (firing furnace) capable of performing a high temperature treatment, and the temperature was increased up to 420° C. stepwise to thereby form a heating process (firing) for 60 minutes.

[Measurement Method of Resistivity]

Surface resistivity (Ω/□) of each belt was measured in the following manner.

As for the measurement of the surface resistivity, a measurement was performed by means of Loresta GP MCP-T610 ASP Probe (manufactured by Mitsubishi Chemical Analytech Co., Ltd.), or Hiresta UP URS Probe (manufactured by Mitsubishi Chemical Analytech Co., Ltd.) in the environment of 25° C./50%. A sample was measured at 5 positions, and an average value thereof was determined. The logarithmic-conversion value of the surface resistivity is presented in the following table 2.

[Mechanical Strength]

Each belt was subjected to measurements of, elastic modulus (MPa), tensile strength (MPa), rupture elongation (%), and folding endurance (times) in the following manners.

As for the measurements of the elastic modulus, the tensile strength and the rupture elongation, the measurements were performed under the following conditions using Autograph AGS-J (manufactured by Shimadzu Corporation). As for a belt having a strength enough for practical use, a belt having the elastic modulus of 8,000 MPa or greater, the tensile strength of 180, and the rupture elongation of 10% or greater was determined as an excellent belt.

Sample shape: dumbbell shape 10 mm×150 mm
Distance between chucks: 115 mm
Tension speed: 10 mm/min Moreover, the measurement of the folding endurance MIT was performed in the following manner. The measurement was performed under the following conditions using MIT-DA (manufactured by TOYO SEIKI SEISAKU-SHO, LTD.). As for a belt having a strength enough for practical use, a belt that endured folding of 200 times or more was determined as an excellent belt.

Sample shape: 15 mm×120 mm
Bending angle: 135°
Bending speed: 175 times/min
Load: 1 kgf

[Preparation Example of Acidic Carbon Black Dispersion Liquid]

Components of an acid carbon black dispersion liquid composition of the following formulation were dispersed by means of a ball mill (Minizeta MZ03 manufactured by Ashizawa Finetech Ltd., using zirconia balls each having a diameter of 0.5 mm) for about 10 minutes at the rotational speed of 1,500 rpm to thereby prepare an acidic carbon black dispersion liquid.

| Materials Constituting Acidic Carbon Black Dispersion Liquid | |
|---|---|
| MA100 (Mitsubishi Chemical Corporation) | 12% by weight |
| U-Varnish S | 26% by weight |
| N-methyl-2-pyrrolidone | 62% by weight |

Note that, the pH of MA100 (Mitsubishi Chemical Corporation) is 3.5.

[Preparation Example of Conductive Carbon Black Dispersion Liquid]

Components of a conductive carbon black dispersion liquid composition of the following formulation were dispersed by means of a ball mill (Minizeta MZ03 manufactured by Ashizawa Finetech Ltd., using zirconia balls each having a diameter of 0.5 mm) for about 10 minutes at the rotational speed of 1,500 rpm to thereby prepare a conductive carbon black dispersion liquid.

| Materials Constituting Conductive Carbon Black Dispersion Liquid | |
|---|---|
| KETJENBLACK EC300J | 2.5% by weight |
| U-Varnish S | 46% by weight |
| N-methyl-2-pyrrolidone | 51.5% by weight |

Note that, the pH of KETJENBLACK EC300J is 9.0, and the DBP oil absorption is 360 $cm^3$/100 g. The DBP oil absorption was measured according to ASTM D 2414.

A coating liquid was obtained by using the dispersion liquids above, blending with the following constitutional materials, and mixing and defoaming the resulting the mixture using a centrifugal stirring deaerator.

Example 1

A coating material (coating liquid) of the following formulation was produced in the manner that an amount of the acidic carbon black in a resulting seamless belt was to be 5% by weight, and an amount of the conductive carbon black in the seamless belt was to be 3% by weight.

The acidic carbon black dispersion liquid and conductive carbon black dispersion liquid obtained in the preparation examples above, and the following materials were homogeneously mixed in the amounts described below, to thereby obtain the coating material.

| | |
|---|---|
| Acidic carbon black dispersion liquid | 6.8% by weight (carbon content: 5% by weight) |
| Conductive carbon black dispersion liquid | 19.7% by weight (carbon content: 3% by weight) |
| U-Varnish S (UBE INDUSTRIES, LTD.; solid content: 18% by weight) | 73.3% by weight |
| Polyether-modified silicone FZ2105 (Dow Corning Toray Co., Ltd.) relative to a total amount of the coating material | 0.005% by weight |

Note that, the total amount of the coating material is a total weight of the acidic carbon black dispersion liquid, the conductive carbon black dispersion liquid, the U-Varnish S, the leveling agent, and the solvent contained in the aforementioned materials.

Example 2

A coating material (coating liquid) of the following formulation was produced in the manner that an amount of the acidic carbon black in a resulting seamless belt was to be 7.5% by weight, and an amount of the conductive carbon black in the seamless belt was to be 3% by weight.

The acidic carbon black dispersion liquid and conductive carbon black dispersion liquid obtained in the preparation examples above, and the following materials were homogeneously mixed in the amounts described below, to thereby obtain the coating material.

| | |
|---|---|
| Acidic carbon black dispersion liquid | 10.3% by weight (carbon content: 7.5% by weight) |
| Conductive carbon black dispersion liquid | 19.7% by weight (carbon content: 3% by weight) |
| U-Varnish S (UBE INDUSTRIES, LTD.; solid content: 18% by weight) | 70.0% by weight |
| Polyether-modified silicone FZ2105 (Dow Corning Toray Co., Ltd.) relative to a total amount of the coating material | 0.005% by weight |

Example 3

A coating material (coating liquid) of the following formulation was produced in the manner that an amount of the acidic carbon black in a resulting seamless belt was to be 10% by weight, and an amount of the conductive carbon black in the seamless belt was to be 3% by weight.

The acidic carbon black dispersion liquid and conductive carbon black dispersion liquid obtained in the preparation examples above, and the following materials were homogeneously mixed in the amounts described below, to thereby obtain the coating material.

| | |
|---|---|
| Acidic carbon black dispersion liquid | 13.7% by weight (carbon content: 10% by weight) |
| Conductive carbon black dispersion liquid | 19.7% by weight (carbon content: 3% by weight) |
| U-Varnish S (UBE INDUSTRIES, LTD.; solid content: 18% by weight) | 66.7% by weight |
| Polyether-modified silicone FZ2105 (Dow Corning Toray Co., Ltd.) relative to a total amount of the coating material | 0.005% by weight |

Example 4

A coating material (coating liquid) of the following formulation was produced in the manner that an amount of the acidic carbon black in a resulting seamless belt was to be 15% by weight, and an amount of the conductive carbon black in the seamless belt was to be 3% by weight.

The acidic carbon black dispersion liquid and conductive carbon black dispersion liquid obtained in the preparation examples above, and the following materials were homogeneously mixed in the amounts described below, to thereby obtain the coating material.

| | |
|---|---|
| Acidic carbon black dispersion liquid | 20.5% by weight (carbon content: 15% by weight) |
| Conductive carbon black dispersion liquid | 19.7% by weight (carbon content: 3% by weight) |
| U-Varnish S (UBE INDUSTRIES, LTD.; solid content: 18% by weight) | 60.0% by weight |
| Polyether-modified silicone FZ2105 (Dow Corning Toray Co., Ltd.) relative to a total amount of the coating material | 0.005% by weight |

Example 5

A coating material (coating liquid) of the following formulation was produced in the manner that an amount of the acidic carbon black in a resulting seamless belt was to be 5% by weight, and an amount of the conductive carbon black in the seamless belt was to be 5% by weight.

The acidic carbon black dispersion liquid and conductive carbon black dispersion liquid obtained in the preparation examples above, and the following materials were homogeneously mixed in the amounts described below, to thereby obtain the coating material.

| | |
|---|---|
| Acidic carbon black dispersion liquid | 6.5% by weight (carbon content: 5% by weight) |
| Conductive carbon black dispersion liquid | 31.3% by weight (carbon content: 5% by weight) |
| U-Varnish S (UBE INDUSTRIES, LTD.; solid content: 18% by weight) | 62.2% by weight |
| Polyether-modified silicone FZ2105 (Dow Corning Toray Co., Ltd.) relative to a total amount of the coating material | 0.005% by weight |

Example 61

A coating material (coating liquid) of the following formulation was produced in the manner that an amount of the acidic carbon black in a resulting seamless belt was to be 5% by weight, and an amount of the conductive carbon black in the seamless belt was to be 15% by weight.

The acidic carbon black dispersion liquid and conductive carbon black dispersion liquid obtained in the preparation examples above, and the following materials were homogeneously mixed in the amounts described below, to thereby obtain the coating material.

| | |
|---|---|
| Acidic carbon black dispersion liquid | 19.4% by weight (carbon content: 5% by weight) |
| Conductive carbon black dispersion liquid | 31.0% by weight (carbon content: 15% by weight) |
| U-Varnish S (UBE INDUSTRIES, LTD.; solid content: 18% by weight) | 49.6% by weight |
| Polyether-modified silicone FZ2105 (Dow Corning Toray Co., Ltd.) relative to a total amount of the coating material | 0.005% by weight |

Comparative Example 1

A coating material (coating liquid) of the following formulation was produced in the manner that an amount of the conductive carbon black in a resulting seamless belt was to be 7.5% by weight.

The conductive carbon black dispersion liquid obtained in the preparation example above, and the following materials were homogeneously mixed in the amounts described below, to thereby obtain the coating material.

| | |
|---|---|
| Conductive carbon black dispersion liquid | 44.4% by weight (carbon content: 7.5% by weight) |
| U-Varnish S (UBE INDUSTRIES, LTD.; solid content: 18% by weight) | 55.6% by weight |
| Polyether-modified silicone FZ2105 (Dow Corning Toray Co., Ltd.) relative to a total amount of the coating material | 0.005% by weight |

Comparative Example 2

A coating material (coating liquid) of the following formulation was produced in the manner that an amount of the acidic carbon black in a resulting seamless belt was to be 13% by weight.

The acidic carbon black dispersion liquid obtained in the preparation example above, and the following materials were homogeneously mixed in the amounts described below, to thereby obtain the coating material.

| | |
|---|---|
| Acidic carbon black dispersion liquid | 19.2% by weight (carbon content: 13% by weight) |
| U-Varnish S (UBE INDUSTRIES, LTD.; solid content: 18% by weight) | 80.8% by weight |
| Polyether-modified silicone FZ2105 (Dow Corning Toray Co., Ltd.) relative to a total amount of the coating material | 0.005% by weight |

Comparative Example 3

A coating material (coating liquid) of the following formulation was produced in the manner that an amount of the acidic carbon black in a resulting seamless belt was to be 20% by weight.

The acidic carbon black dispersion liquid obtained in the preparation example above, and the following materials were homogeneously mixed in the amounts described below, to thereby obtain the coating material.

| | |
|---|---|
| Acidic carbon black dispersion liquid | 29.4% by weight (carbon content: 20% by weight) |
| U-Varnish S (UBE INDUSTRIES, LTD.; solid content: 18% by weight) | 70.6% by weight |
| Polyether-modified silicone FZ2105 (Dow Corning Toray Co., Ltd.) relative to a total amount of the coating material | 0.005% by weight |

Comparative Example 4

A coating material (coating liquid) of the following formulation was produced in the manner that an amount of the acidic carbon black in a resulting seamless belt was to be 28% by weight.

The acidic carbon black dispersion liquid obtained in the preparation example above, and the following materials were homogeneously mixed in the amounts described below, to thereby obtain the coating material.

| | |
|---|---|
| Acidic carbon black dispersion liquid | 40.7% by weight (carbon content: 28% by weight) |
| U-Varnish S (UBE INDUSTRIES, LTD.; solid content: 18% by weight) | 59.2% by weight |
| Polyether-modified silicone FZ2105 (Dow Corning Toray Co., Ltd.) relative to a total amount of the coating material | 0.005% by weight |

The blending ratio of each composition is presented in Table 1.

TABLE 1

| | Each carbon black content | | Added amount (wt %) | | | |
|---|---|---|---|---|---|---|
| Examples | Conductive | Acidic | Conductive carbon black | Acidic carbon black | Polyamic acid varnish | Leveling agent |
| Ex. 1 | 3.0% | 5.0% | 19.7 | 6.8 | 73.3 | 0.005 |
| Ex. 2 | 3.0% | 7.5% | 19.7 | 10.3 | 70.0 | 0.005 |
| Ex. 3 | 3.0% | 10.0% | 19.7 | 13.7 | 66.7 | 0.005 |
| Ex. 4 | 3.0% | 15.0% | 19.7 | 20.5 | 60.0 | 0.005 |
| Ex. 5 | 5.0% | 5.0% | 31.3 | 6.5 | 62.2 | 0.005 |
| Ex. 6 | 5.0% | 15.0% | 31.0 | 19.4 | 49.6 | 0.005 |
| Comp. Ex. 1 | 7.5% | 0.0% | 44.4 | 0.0 | 55.6 | 0.005 |
| Comp. Ex. 2 | 0.0% | 13.0% | 0.0 | 19.2 | 80.8 | 0.005 |

TABLE 1-continued

| | Each carbon black content | | Added amount (wt %) | | | |
|---|---|---|---|---|---|---|
| Examples | Conductive | Acidic | Conductive carbon black | Acidic carbon black | Polyamic acid varnish | Leveling agent |
| Comp. Ex. 3 | 0.0% | 20.0% | 0.0 | 29.4 | 70.6 | 0.005 |
| Comp. Ex. 4 | 0.0% | 28.0% | 0.0 | 40.7 | 59.2 | 0.005 |

[Results of Examples]

The measurement results are presented in Table 2.

TABLE 2

| | | Evaluation results | | | | |
|---|---|---|---|---|---|---|
| Examples | Thickness | Elastic modulus (MPa) | Tensile strength (MPa) | Rapture elongation (%) | Folding endurance (times) | Logarithmic value of surface resistivity (Ω/□) |
| Ex. 1 | 91 | 10,109 | 299 | 18 | 934 | 7.5 |
| Ex. 2 | 87 | 9,283 | 271 | 16 | 1,286 | 5.1 |
| Ex. 3 | 83 | 9,530 | 261 | 13 | 586 | 4.6 |
| Ex. 4 | 83 | 10,049 | 246 | 10 | 251 | 2.9 |
| Ex. 5 | 85 | 6,743 | 294 | 18 | 1,170 | 2.0 |
| Ex. 6 | 78 | 8,717 | 253 | 13 | 229 | 1.9 |
| Comp. Ex. 1 | 88 | 8,492 | 230 | 8 | 894 | 1.4 |
| Comp. Ex. 2 | 70 | 10,692 | 211 | 22 | 16,187 | 13.0 or greater, outside the measurement range |
| Comp. Ex. 3 | 78 | 9,405 | 184 | 8 | 7,912 | 7.1 |
| Comp. Ex. 4 | 87 | 3,175 | 5 | 6 | 266 | 6.3 |

Examples 1 to 6 exhibits excellent performances in all of the properties.

Similarly to other resin materials containing carbon, a polyimide belt, in which carbon particles are dispersed, exhibits positive characteristic resistance (a resistance value increases as temperature increases). In a site where a toner image is fixed, therefore, it is easy to charge (it is difficult to release charge) compared to other side, such as a transfer site, as temperature is high. Therefore, high friction charge, which is not desirable, is cause by a contact with other members in the apparatus, to impair delivery of an image support (e.g., paper, and a film). In the present invention, however, contact friction charging is suppressed, as the "external appearance," particularly "surface smoothness," is improved.

On the other hand, in Comparative Example 1, moreover, a sufficient result of the rupture elongation could not be obtained, the belt lacked flexibility, and the results showed the belt could not endure use over a long period.

In Comparative Example 2, moreover, the evaluations were performed with the acidic carbon black content of 13% by weight. However, the surface resistivity was high, which was outside the measurement range of Hiresta.

In Comparative Example 3, the appropriate surface resistivity was narrowly secured, as the acid carbon black content was 20% by weight. However, the sufficient rapture elongation could not be secured.

In Comparative Example 4, moreover, mechanical strength of the belt, including the elastic modulus, could not be secured, as the acidic carbon black content was very high, that was 28% by weight.

Based on the results above, the present invention can provide a polyimide seamless belt, which has excellent appearance, secures mechanical strength and electric resistance, has a film thickness of 60 μm or greater, and is mounted in an image forming apparatus of an electrophotographic system.

This application claims priority to Japanese application No. 2014-163559, filed on Aug. 11, 2014 and incorporated herein by reference.

What is claimed is:

1. A polyimide seamless belt for an image forming apparatus, comprising:
   polyimide containing a segment derived from aromatic diamine, and a segment derived from aromatic tetracarboxylic acid; and
   two types of carbon black, which are high-structure carbon black capable of imparting high conductivity, and acidic carbon black, where the two types of the carbon black are dispersed in the polyimide seamless belt,
   wherein the polyimide seamless belt has surface resistivity of $10^8 \Omega/\square$ or less.

2. The polyimide seamless belt according to claim 1, wherein a total amount of the two types of the carbon black in the polyimide seamless belt is 8% by weight to 23% by weight.

3. The polyimide seamless belt according to claim 1, wherein the high-structure carbon black contained in the polyimide seamless bel has pH of 6 or higher.

4. The polyimide seamless belt according to claim 1, wherein an amount of the high-structure carbon black in the polyimide seamless belt is 3% by weight to 6% by weight.

5. The polyimide seamless belt according to claim 1, wherein the acidic carbon black contained in the polyimide seamless belt has pH of 4.5 or lower.

6. The polyimide seamless belt according to claim 1, wherein an amount of the acidic carbon black in the polyimide seamless belt is 5% by weight to 17% by weight.

7. A production method of a polyimide seamless belt, comprising:
preparing a polyimide precursor coating liquid, in which polyamic acid that is a polyimide precursor obtained through a reaction between aromatic diamine and aromatic tetracarboxylic acid, high-structure carbon black capable of imparting high conductivity, and acidic carbon black are dissolved or dispersed in an organic solvent;
forming a seamless belt shaped product having a predetermined thickness with the coating liquid; and
drying the seamless belt shaped product, followed by converting the polyamic acid into polyimide, to thereby produce a polyimide seamless belt having surface resistivity of $10^8 \Omega/\square$ or less,
wherein the polyimide seamless belt contains the polyimide containing a segment derived from the aromatic diamine, and a segment derived from the aromatic tetracarboxylic acid.

8. An image forming apparatus, comprising:
an electrostatic latent image forming unit configured to form an electrostatic latent image on an image bearer;
a developing unit configured to develop the electrostatic latent image formed on the image bearer with a toner to form a toner image;
a primary transfer unit configured to transfer the toner image from the image bearer onto an intermediate transfer member, where the intermediate transfer member may be a seamless belt;
a secondary transfer unit configured to transfer the toner image from the intermediate transfer member onto a recording medium; and
a fixing unit which is configured to fix the toner image on the recording medium and may contain a seamless belt member,
wherein at least one of the seamless belts used in the image forming apparatus is a polyimide seamless belt which contains:
polyimide containing a segment derived from aromatic diamine, and a segment derived from aromatic tetracarboxylic acid; and
two types of carbon black, which are high-structure carbon black capable of imparting high conductivity, and acidic carbon black, where the two types of the carbon black are dispersed in the polyimide seamless belt,
wherein the polyimide seamless belt has surface resistivity of $10^8 \Omega/\square$ or less.

* * * * *